United States Patent
Ricke

(10) Patent No.: US 11,486,793 B2
(45) Date of Patent: Nov. 1, 2022

(54) ELECTRIC DRIVE UNIT HAVING INTELLIGENT MAINTENANCE REQUIREMENT MONITORING

(71) Applicant: Lenze Drives GmbH, Extertal (DE)

(72) Inventor: Tim-Oliver Ricke, Barsinghausen (DE)

(73) Assignee: Fras-Le S.A., Farroupilha (BR)

( * ) Notice: Subject to any disclaimer, the term of this patent is extended or adjusted under 35 U.S.C. 154(b) by 678 days.

(21) Appl. No.: 16/470,623

(22) PCT Filed: Jan. 25, 2018

(86) PCT No.: PCT/EP2018/051828
§ 371 (c)(1),
(2) Date: Jun. 18, 2019

(87) PCT Pub. No.: WO2018/138198
PCT Pub. Date: Aug. 2, 2018

(65) Prior Publication Data
US 2019/0323923 A1    Oct. 24, 2019

(30) Foreign Application Priority Data
Jan. 28, 2017    (DE) .......................... 102017000821.3

(51) Int. Cl.
*G01M 15/02*    (2006.01)
*G07C 3/14*    (2006.01)
*G05B 19/042*    (2006.01)

(52) U.S. Cl.
CPC .......... *G01M 15/02* (2013.01); *G05B 19/0428* (2013.01); *G07C 3/14* (2013.01); *G05B 2219/24015* (2013.01)

(58) Field of Classification Search
CPC ...... G01M 15/02; G05B 19/0428; G07C 3/14
See application file for complete search history.

(56) References Cited

U.S. PATENT DOCUMENTS 5,726,911 A     3/1998  Canada
7,991,586 B2 *  8/2011  Silovic ................ F04D 15/0088
                                                       702/183
(Continued)

FOREIGN PATENT DOCUMENTS

DE        3828207 A1    2/1990
DE    102005051452 A1   5/2007
(Continued)

OTHER PUBLICATIONS

WIPO, International Search Report (in priority application), dated May 4, 2018.

*Primary Examiner* — Bryan Bui
(74) *Attorney, Agent, or Firm* — Laurence P. Colton; Smith Tempel Blaha LLC

(57) ABSTRACT

An electric drive unit having an electric motor having a flange-mounted adapter that is attached to the electric motor and has a motor shaft extension for extending the motor shaft through the adapter. The electric drive unit has at least one sensor for measuring at least one operating variable of the electric motor and an evaluation unit for evaluating the operating variable(s) measured by the sensor(s). The sensor(s) and evaluation unit are arranged in and/or on the electric motor and/or adapter. The evaluation unit is designed to evaluate the measured operating variable(s) with respect to the need for maintenance and/or repair and to output a signal about the need for maintenance and/or repair via a signal transmission device for signaling the need for maintenance if the result of the evaluation of the operating variable(s) indicates the need for maintenance.

13 Claims, 1 Drawing Sheet

(56) References Cited

U.S. PATENT DOCUMENTS

2006/0074513 A1     4/2006   DeRose
2009/0125252 A1*   5/2009   Silovic ................ F04D 15/0088
                                                                          702/116

FOREIGN PATENT DOCUMENTS

| EP | 1262922 A2 | 12/2002 |
| EP | 2884464 A1 | 6/2015 |
| WO | 2009102257 A1 | 8/2009 |

* cited by examiner

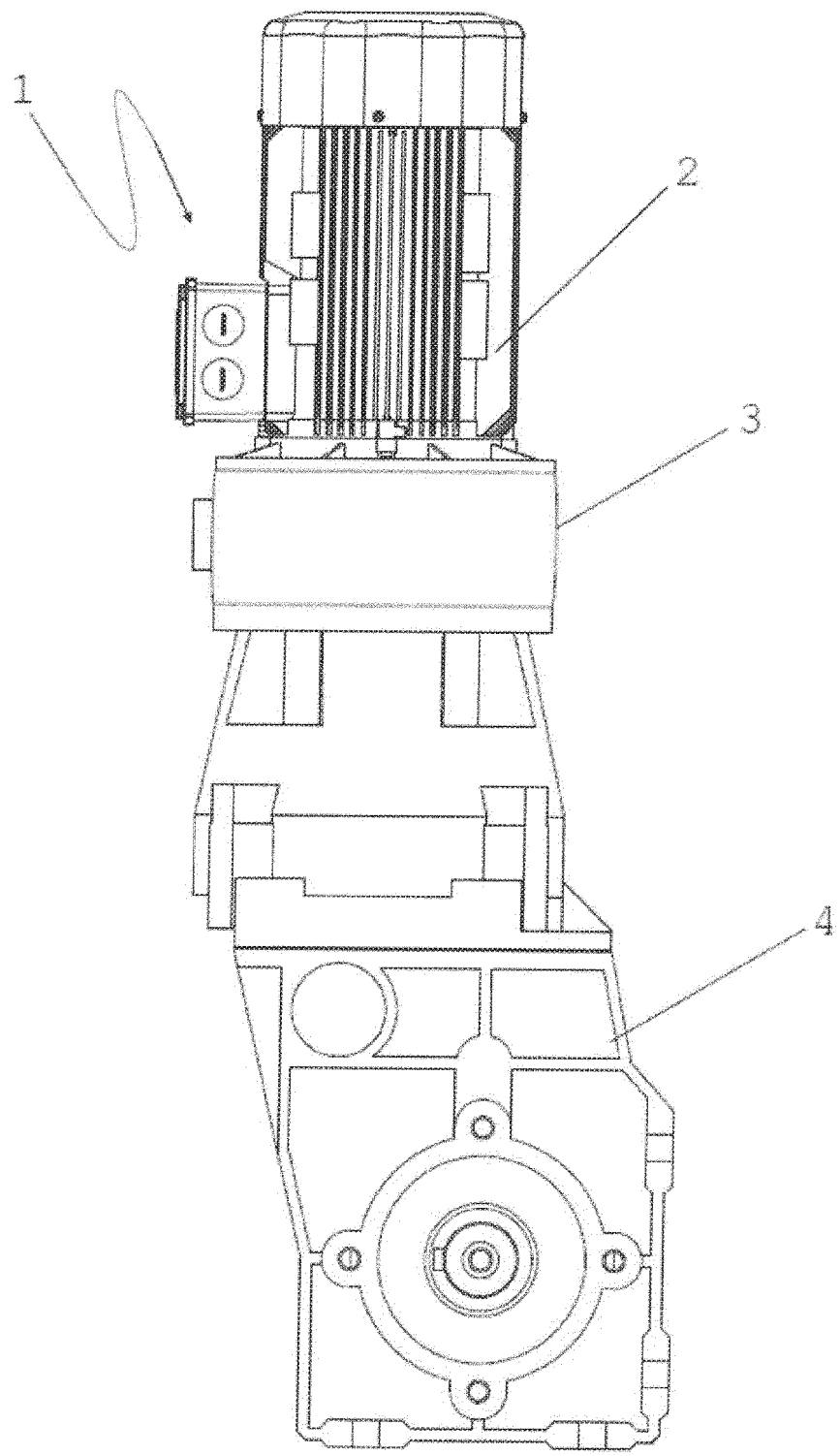

ELECTRIC DRIVE UNIT HAVING INTELLIGENT MAINTENANCE REQUIREMENT MONITORING

CROSS REFERENCE TO RELATED APPLICATIONS

The application is the US National Phase of International Application No. PCT/EP2018/051828 having an International Filing Date of 25 Jan. 2018, which claims the benefit of and priority on German Patent Application No. 10 2017 000 821.3 having a filing date of 28 Jan. 2017.

BACKGROUND OF THE INVENTION

Technical Field

The invention relates to an electric drive unit comprising an electric motor and an adapter for an electric drive unit.

Electric drive units of the type in question are regularly subject to a certain amount of wear. This leads to maintenance and/or repairs becoming necessary. In order to avoid downtime and damage which can result from the sudden failure of an electrical drive unit of this kind due to a defect, there are different strategies for anticipating a possible failure of the drive unit using regular maintenance.

The first and simplest of these strategies is to carry out maintenance at regular time intervals. The disadvantage of this strategy, however, is that the maintenance intervals have to be selected so as to be comparatively short in order to reliably avoid failures. In practice, this leads to a large number of superfluous maintenance works being carried out.

A second possibility is that the control device of the electric drive unit determines a possible maintenance requirement on the basis of measured operating variables, such as measured operating times. Operating times are understood in this case to mean the times when the electric drive unit is actually in operation or, in other words, the electric motor actually drives something.

Prior Art

Some information systems are already known. US 2006 074 513 A1 discloses a sensor set which is attached to the engine together with a monitor system. The measured data are processed for pre-control and display, and transmitted to a central evaluation unit. There, maintenance and repair requirements are then determined.

DE 38 28 207 A1 discloses a diagnostic connector by means of which collected parameters of a machine or pump can be read out and evaluated. U.S. Pat. No. 5,726,911 A discloses a monitor system which is arranged on the housing of an electric motor and detects, processes and stores parameters. The data can then be forwarded to an external system for further processing.

These systems are disadvantageous in that the data has to be supplied to a central evaluation unit in order to determine the maintenance and repair requirements.

Since electric drive units are often components of complex electrical systems in which the operating times per fixed time interval can be extremely different, substantially longer maintenance intervals can be achieved in many cases. Of course, this is particularly advantageous when the electric drive unit in a technical system is in operation only rarely and/or only for short times. The disadvantage is that the relevant control unit must be adjusted very precisely to the electric drive unit or, in other words, has to "know" the specific maintenance requirements of the relevant electric drive unit. Since, especially in complex technical systems, the higher-level control devices which control the individual drives and the drives themselves are regularly produced by different suppliers, there are in practice significant compatibility problems when implementing solutions of this kind, as a result of which solutions of this kind are often not implemented in practice although they would in principle be technically meaningful.

BRIEF SUMMARY OF THE INVENTION

The problem addressed by the present invention is that of providing an electric drive unit which has a decrease in maintenance requirements while simultaneously having high compatibility with other components of technical systems, and therefore high universal applicability.

The problem is solved by an electric drive unit comprising an electric motor, comprising a flanged-mounted adapter that is attached to the electric motor and has a motor shaft extension for extending the motor shaft through the adapter, and at least one sensor for measuring at least one operating variable of the electric motor and an evaluation unit for evaluating the operating variable(s) measured by the sensor (s), wherein the sensor(s) and evaluation unit are arranged in and/or on the electric motor and/or adapter, wherein the evaluation unit is designed to evaluate the measured operating variable(s) with respect to the need for maintenance and/or repair and to output a signal about the need for maintenance and/or repair via a signal transmission device for signaling the need for maintenance if the result of the evaluation of the operating variables(s) indicates the need for maintenance. The features of the dependent claims relate to advantageous embodiments.

BRIEF DESCRIPTION OF THE DRAWING

FIG. 1 is an embodiment of the electric drive unit having intelligent maintenance requirement monitoring according to the invention.

DETAILED DESCRIPTION OF PREFERRED EMBODIMENTS

The electric drive unit according to the invention has an electric motor. In addition, the drive unit has at least one sensor for measuring at least one operating variable of the electric motor. The core of the invention is that the drive unit has an evaluation unit, in and/or on the drive unit, for evaluating the operating variable measured by the sensor. According to the invention, this evaluation unit is designed to evaluate the measured operating variable with respect to the need for maintenance and/or repair. In this case, the evaluation can be based on an operating variable measured by a sensor, but it is also possible for a plurality of operating variables to be measured using a single sensor and to form the basis of the evaluation. Likewise, a plurality of operating variables which are measured by a plurality of sensors can form the basis of the evaluation. In order to make the following description easier to understand, only the singular form of the sensor and the operating variable will be used in the following.

Within the meaning of the present invention, it is essential that the evaluation unit is also designed to output a signal about the need for maintenance via a signal transmission device if the result of the evaluation of the operating variable indicates the need for maintenance. Within the meaning of the present invention, the signal transmission device is used to output a signal about the need for maintenance and/or repair. The advantage of the present invention over the prior art is immediately apparent at this point. In contrast to the drive units known from the prior art, not only pure measurement signals are output, which are at best slightly electronically edited, for example digitized, and still have to be processed, but the output signal already contains the immediate information about a present maintenance and/or repair requirement. For linguistic simplification, only the term "maintenance requirement" is used in the following for the maintenance and/or repair requirement.

By means of the present invention, the drive unit effectively receives its own "intelligence" which allows it to decide on the presence of a maintenance requirement effectively "independently". This makes the drive unit according to the invention largely independent from the design of other components of the technical system in this respect or makes it possible to adapt the drive unit according to the invention in the simplest manner to the requirements of a relevant technical system.

Therefore, for example, in particular in the case of simple technical systems which optionally have no higher-level control at all, the signal transmission device can have an optical and/or acoustic device for transmitting the signal. By means of a device of this kind, it is possible to signal directly to the operator, for example via a warning light or a warning tone, that there is a need for maintenance. In applications of this kind, therefore, there is almost no need for technical integration with regard to the communication between the signal transmission device and other information-processing technical devices of a relevant technical system. For example, it is also possible to provide a display on the electric drive unit, which display provides information about the state of wear on the basis of the signal. Optionally, further parameters, for example the number of operating hours, can also be displayed. As a result, an "aging display" can be produced, which makes it possible to directly assess the condition of the monitored electric motor on site.

According to an advantageous development, however, the signal transmission device can also have a wireless and/or wired interface for transmitting the signal as a data signal. An interface of this kind is advantageous in that the drive unit according to the invention can communicate with data-processing technical devices, in particular a higher-level controller of a technical system can further process the output data signals. Compared to the prior art, this results in the substantial advantage that complex evaluation of the signal is no longer necessary with regard to the question of maintenance requirements, since said signal already contains the information about the present maintenance requirement. Specifically, this means, for example, that, when integrating the drive unit according to the invention in a technical system comprising a higher-level controller, this controller has to "know" practically no information about the technical design of the drive unit in order to extract the information about the maintenance requirement from the transmitted signal of the drive device. Instead, only minimal information about the type of signal or, in other words, the "language" of the signal is needed to enable a higher-level controller to process the signal. If, as is conventional in complex technical systems, the higher-level controller and the drive unit are supplied by different companies, only a minimum effort is required to ensure the compatibility between the higher-level controller and the drive unit with regard to signaling maintenance requirements. Minimizing this "coordination effort" between a plurality of persons involved in the design of a complex technical system in this case means in practice a considerable minimum effort and therefore a large time and cost advantage.

In this case, a large number of technologies that are already known from other fields of technology can be used as the interface, for example I/O signals, industrial fieldbuses, Ethernet, radio, WLAN, Bluetooth, NFC or similar technologies.

According to a preferred embodiment, the interface also allows a plurality of electric drive units to communicate with one another. This can be used, for example, to redirect the signal of an electric drive unit to another drive unit and to output said signal therein. The signal can be output by the display on a screen, for example. In this way, a plurality of optionally different drive units can be networked to one another and monitored with respect to their maintenance and/or repair requirement, without the need for a higher-level controller. The monitoring can take place from one of the drive units.

According to a particularly preferred embodiment, the evaluation unit and/or the sensor, advantageously both, and/or the further components such as the signal transmission device, the operating time measuring device, the interface, optical and/or acoustic devices for transmitting the signal, the rotational speed and/or rotational direction sensor, the signal input for receiving further data and/or signals, the temperature sensor, and/or the display, are provided in an adapter. The adapter is used to connect the electric motor to the technical system, in particular to a transmission, and preferably has a motor shaft extension for this purpose. Furthermore, the adapter advantageously has a separate housing. The housing of the adapter preferably has a flange for connecting the adapter to the electric motor and/or a flange for connecting the adapter to the technical device driven by the electric motor. This technical device can preferably be a transmission.

An adapter of this kind makes it possible to retrofit existing technical systems by equipping the electric motors therein with the adapters according to the invention and therefore turning them into electric drive units within the meaning of the present invention. Moreover, when designing new technical systems, almost any electric motors can be combined with the advantageous adapters to form electric drive units according to the invention. This allows greater flexibility in the selection of components, since an adapter of this kind can in principle be combined with almost any electric motor. The evaluation electronics can preferably be designed, in particular programmed, with regard to the requirements of the relevant electric motor.

It is particularly advantageous to provide the drive unit according to the invention as a modular system. A drive unit and a plurality of evaluation units are provided in an advantageous modular system of this kind. The evaluation unit now has an evaluation device receptacle. One evaluation unit can be selected from this plurality of available evaluation units and received by the evaluation device receptacle. In this way, depending on the requirements placed on a specific drive unit, different evaluation units that have different functionalities can be received in the drive unit and thus combined therewith. As a result, a comparatively small number of assemblies makes it possible to provide a large number of different drive units according to the invention for different purposes. It is noted that a modular system of this kind can also have a plurality of different drive units which can be combined with the different evaluation units. It is particularly advantageous if the evaluation device receptacle is part of an adapter of a drive unit according to the invention.

According to a preferred embodiment, the drive unit has an operating time measuring device for detecting the operating times of the electric drive unit. These are preferably evaluated by an operating time evaluation unit, which in turn is advantageously a component of the evaluation device. This allows the operating times, which are advantageously included in the evaluation with respect to a possible maintenance requirement as an output variable, to be detected.

Furthermore, the drive unit can have a rotational speed and/or rotational direction sensor for measuring the rotational speed and/or rotational direction. A corresponding rotational speed and/or rotational direction evaluation unit can also advantageously be provided, in particular as a component of the evaluation unit. In this way, the data about the precise operating conditions of the electric drive unit can be collected, as a result of which said data can form the basis of the evaluation with respect to a maintenance requirement and/or can be introduced into this evaluation.

According to a preferred embodiment, the drive unit, in particular the evaluation unit, has a signal input for receiving further data and/or signals. These preferably come from other measurement, regulation and/or control technology devices. The evaluation device is preferably designed to also evaluate these further data and/or signals with respect to the need for maintenance and/or repair. A signal input of this kind can, for example, be used to recognize the slippage of a belt conveyor such as a baggage conveyor belt. However, output data, such as trigger signals, can also be processed by external ammeters. As a result, it is possible for measured variables that cannot be measured directly on or in the electric drive unit to be included in the evaluation.

It is advantageous when the evaluation unit is designed to evaluate the measured operating variables and/or the further data with respect to the mechanical and/or electrical loading of the electric drive unit. This makes it possible in particular for a wear parameter to be calculated. This parameter can then be used, as a function of the respective operating times at a certain load, as an output variable of the evaluation with respect to the need for maintenance. An evaluation of this kind makes it possible, for example, to give more weight to operating times at a high load than operating times at a low load, and in this way to obtain a more precise measurement of the wear resulting from the different loads.

The evaluation unit is preferably designed to also evaluate the measured operating variables and/or the further data and/or signals with respect to the need for maintenance becoming necessary in the future. Depending on this result, a signal about the future need for maintenance can then advantageously be output. The advantage of being able to signal not only an actual need for maintenance, but also a future need for maintenance, is that the operator of a technical system comprising a drive unit according to the invention can prepare in the longer term for carrying out maintenance, i.e. in other words, said operator it is warned in good time that maintenance will become necessary in a foreseeable period of time. This will enable said operator to minimize losses caused by operational interruptions during maintenance by specifically scheduling maintenance at a particular point in time.

It is also advantageous when the drive unit has a temperature sensor. According to a particularly advantageous embodiment, the evaluation unit can also calculate temperatures at other locations of the electric drive unit on the basis of the measured temperature data. A temperature evaluation unit which is used to evaluate the temperatures measured by the temperature sensor can in this case be a component of the evaluation unit. In this way, thermal loads can also form the basis of the evaluation.

Likewise, devices for measuring temperature and/or humidity of the surroundings of the electric drive unit may be present. These data can be used, in particular in conjunction with an internal temperature sensor and using a thermal model of the electric drive unit, to calculate the temperatures and therefore the thermal loads at different points of the drive unit.

It is also advantageous to provide a vibration sensor for acting forces to be measured, or to measure and evaluate the power requirement of the drive unit. The results of the evaluation of the power requirement can advantageously also be included in the evaluation in order to confirm a possible maintenance requirement.

A sensor for measuring a property of the transmission oil of a transmission connected to the electric drive unit is also conceivable. This can be, for example, a photocell, for example to check the turbidity of the transmission oil and/or to detect impurities and/or metal in the motor oil.

It can also be advantageous when the evaluation device has a data storage device and is therefore enabled to log the detected data. Interventions in the drive device, such as maintenance works that have been carried out, can also be stored in the storage. The evaluation of this data can then be used to improve further evaluations with respect to their accuracy.

Way of Implementing the Invention

The electric drive unit 1 shown by way of example in FIG. 1 has an electric motor 2 and, advantageously, an adapter 3. In the example shown, the adapter 3 contains a sensor and evaluation unit and is connected to a transmission 4 by means of the adapter. The adapter 3 shown by way of example is designed such that it can use the voltage supply of the motor. A separate external power supply for the adapter is not necessary in this example. Alternatively, however, it can be provided.

The adapter 3 shown by way of example detects rotational speed and temperature values. These are evaluated by the evaluation unit provided in the adapter 3. A signal about the need for maintenance and/or repair is output via a signal transmission device. In the example shown, this advantageously occurs via a visual status display. In the example shown, the status display is preferably provided on or in the smart adapter 3.

What is claimed is:

1. An electric drive unit comprising:
   an electric motor, comprising a flanged-mounted adapter that is attached to the electric motor and has a motor shaft extension for extending a shaft of the motor through the adapter (3);
   at least one sensor for measuring at least one operating variable of the electric motor; and
   an evaluation unit for evaluating said at least one operating variable measured by said at least one sensor,
   wherein said at least one sensor and the evaluation unit are arranged on at least one of the electric motor and the adapter, and
   wherein the evaluation unit is configured to evaluate said at least one operating variable measured with respect to a requirement for maintenance and to output a signal about the requirement for maintenance via a signal transmission device for signaling the need for maintenance if the result of the evaluation of said at least one operating variable indicates the need for maintenance.

2. The electric drive unit according to claim 1, further comprising a transmission, the adapter being arranged between the electric motor and the transmission, and wherein the signal transmission device is in the adapter.

3. The electric drive unit according to claim 1, wherein the signal transmission device has at least one of an optical device and an acoustic device for transmitting the signal.

4. The electric drive unit according to claim 1, wherein the signal transmission device has at least one of a wireless interface and a wired interface for transmitting the signal as a data signal.

5. The electric drive unit according to claim 1, wherein said at least one sensor comprises an operating time measuring device for detecting the operating times of the electric drive unit, and wherein the evaluation unit comprises an operating time evaluation unit for evaluating the operating times measured by the operating time measuring device.

6. The electric drive unit according to claim 1, wherein said at least one sensor comprises at least one of a rotational speed and a rotational direction sensor for measuring the rotational speed and the rotational direction, respectively, and wherein the evaluation unit comprises said at least one of a rotational speed evaluation unit and a rotational direction evaluation unit for evaluating at least one of the rotational speed and the rotational direction measured by said at least one of a rotational speed and a rotational direction sensor.

7. The electric drive unit according to claim 1, wherein the electric drive unit has a signal input for receiving at least one of further data and signals from at least one of measuring, regulation and control technology devices external to the electric drive unit, and wherein the evaluation unit is configured to evaluate said at least one further data and signals with respect to the requirement for maintenance.

8. An adapter for a drive unit according to claim 7, wherein the evaluation unit is configured to evaluate at least one of said at least one operating variable measured and said at least one of further data and signals with respect to at least one of mechanical loading and electrical loading of the electric drive unit by calculating a wear parameter as a function of respective operating times at respective loads and outputting the wear parameter as an output variable of the evaluation with respect to the requirement for maintenance.

9. The electric drive unit according to claim 7, wherein the evaluation unit is configured to evaluate said at least one of said at least one operating variable measured and said at least one of the further data and signals with respect to a requirement for maintenance in the future, and outputting, via the signal transmission device, a signal about the requirement for maintenance in the future if the result of the evaluation indicates a requirement for maintenance in the future.

10. An adapter for a drive unit according to claim 1, wherein the evaluation unit is configured to evaluate said at least one measured operating variable with respect to at least one of mechanical loading and electrical loading of the electric drive unit by calculating, a wear parameter as a function of respective operating times at respective loads and outputting the wear parameter as an output variable of the evaluation with respect to the requirement for maintenance.

11. The electric drive unit according to claim 1, wherein the evaluation unit is configured to evaluate said at least one operating variable measured with respect to a requirement for maintenance in the future, and outputting, via the signal transmission device, a signal about the requirement for maintenance in the future if the result of the evaluation indicates a requirement for maintenance in the future.

12. The electric drive unit according to claim 1, wherein said at least one sensor comprises a temperature sensor for measuring a temperature of the electric drive unit, and wherein the evaluation unit comprises a temperature evaluation unit for evaluating the temperature measured by the temperature sensor, the temperature evaluation unit being configured to calculate a temperature at a point of the electric drive unit that is spaced apart from the location of the temperature sensor on the basis of the measured temperature.

13. A modular system for providing a drive unit according to claim 1, wherein the adapter includes an evaluation unit receptacle for receiving the evaluation unit, and wherein the evaluation unit is selected from a plurality of evaluation units, and wherein the evaluation unit receptacle is configured to receive any evaluation unit selected from the plurality of evaluation units.

* * * * *